(12) United States Patent  
Foley et al.

(10) Patent No.: US 8,094,606 B1
(45) Date of Patent: Jan. 10, 2012

(54) ADJUSTING TRANSMISSION POWER UNDER CHANGING CONDITIONS

(75) Inventors: Conor Foley, Sterling, VA (US); Christopher Donald Gregory, Potomac Falls, VA (US); Sang Ho Go, Sterling, VA (US); Venugopal Eyyunni, Centreville, VA (US)

(73) Assignee: VT Idirect, Inc., Herndon, VA (US)

( * ) Notice: Subject to any disclaimer, the term of this patent is extended or adjusted under 35 U.S.C. 154(b) by 878 days.

(21) Appl. No.: 11/764,020

(22) Filed: Jun. 15, 2007

(51) Int. Cl.
*H04B 7/185* (2006.01)
(52) U.S. Cl. ............... 370/318; 455/8; 455/9; 455/11.1; 455/12.1; 455/13.1; 455/10
(58) Field of Classification Search .................. 370/318; 455/8–13.1
See application file for complete search history.

(56) References Cited

U.S. PATENT DOCUMENTS

| | | | | |
|---|---|---|---|---|
| 4,941,199 A * | 7/1990 | Saam | ............................... | 455/10 |
| 5,815,796 A * | 9/1998 | Armstrong et al. | ............. | 455/10 |
| 6,212,360 B1 * | 4/2001 | Fleming et al. | .............. | 455/13.4 |
| 6,272,340 B1 * | 8/2001 | Wright et al. | ................. | 455/427 |
| 6,763,006 B1 * | 7/2004 | Lockett | .......................... | 370/318 |
| 6,813,476 B1 * | 11/2004 | Brooker | ........................... | 455/10 |
| 7,171,159 B2 * | 1/2007 | Di Camillo et al. | ........... | 455/13.4 |
| 2006/0270442 A1 * | 11/2006 | Miller et al. | ................... | 455/522 |
| 2007/0206525 A1 * | 9/2007 | Miller et al. | ................... | 370/321 |
| 2008/0274690 A1 * | 11/2008 | Laufer | .......................... | 455/13.4 |

OTHER PUBLICATIONS

U.S. Appl. No. 11/763,986, filed Jun. 15, 2007, Eyyunni et al.
U.S. Appl. No. 11/764,004, filed Jun. 15, 2007, Foley et al.

* cited by examiner

*Primary Examiner* — Jinsong Hu
*Assistant Examiner* — Qun Shen
(74) *Attorney, Agent, or Firm* — Oblon, Spivak, McClelland, Maier & Neustadt, L.L.P.

(57) ABSTRACT

A communication system includes a hub, a repeater, and a remote. The hub is configured to adjust a transmission power of the remote depending on an external condition based on (i) a measured carrier-to-noise ratio $CN_{Hubsignal1}$ of data transmitted from the hub to the repeater and back to the hub using a first signal, (ii) a measured carrier-to-noise ratio $CN_{Hubsignal2}$ of data transmitted from the remote to the hub via the repeater using a second signal, (iii) a predetermined carrier-to-noise ratio $CN_{HubSCPCCS}$ of data transmitted from the hub to the repeater and back to the hub using the first signal under a clear sky condition, and (iv) a predetermined carrier-to-noise ratio $CN_{HubTDMACS}$ of data transmitted from a reference remote to the repeater and back to the hub using the second signal under a clear sky condition.

26 Claims, 6 Drawing Sheets

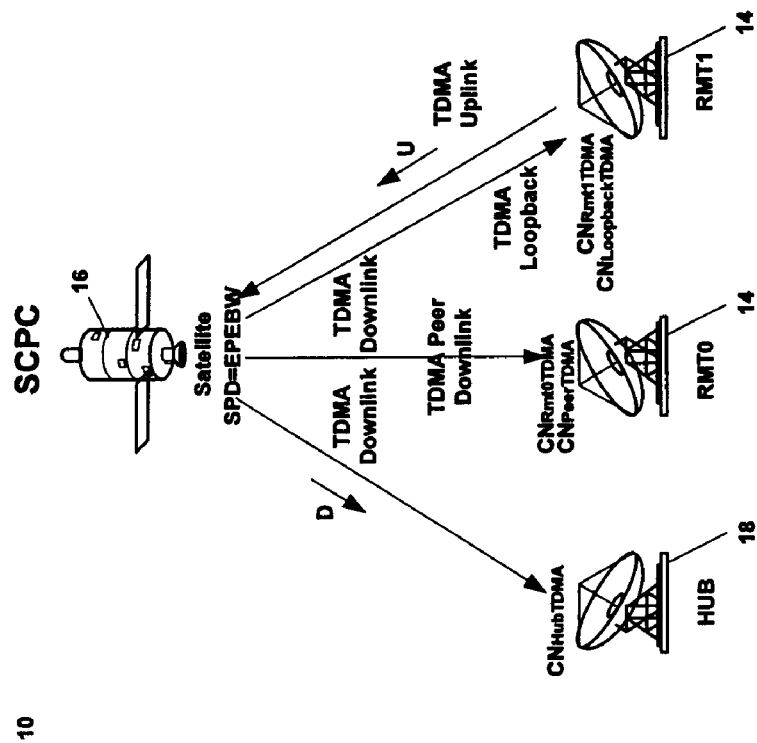
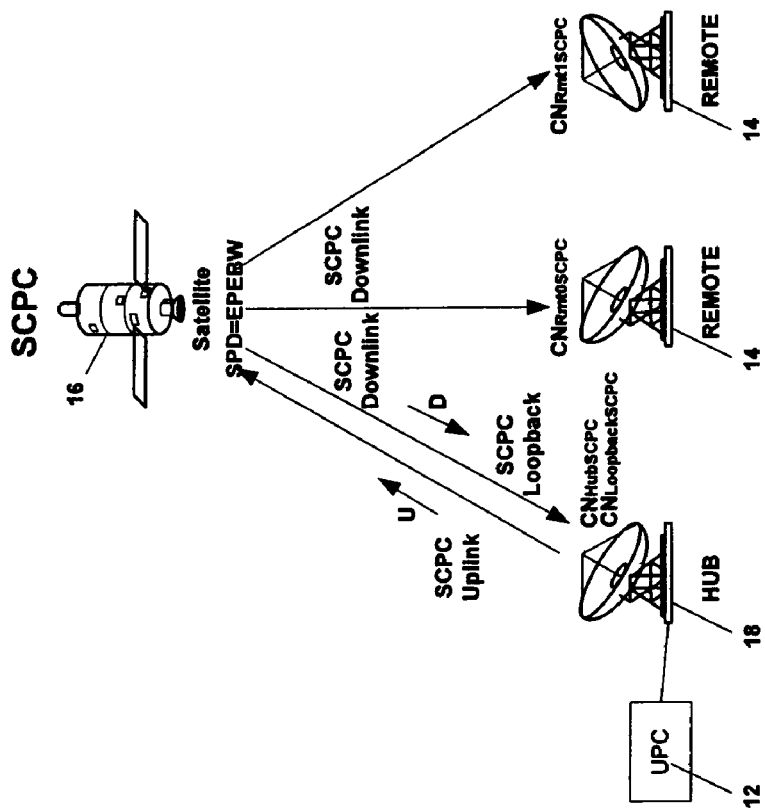

ADJUSTING TRANSMISSION POWER UNDER CHANGING CONDITIONS

BACKGROUND OF THE INVENTION

1. Field of the Invention

This invention relates to methods, apparatuses and satellite-based communication systems in which a transmission power level of a device that receives/transmits data is adjusted depending on changing external conditions.

2. Discussion of the Background

Communication networks that transmit data via electromagnetic waves radiated in air or vacuum are constrained in terms of the available power-bandwidth. For example, it is known that a repeater that retransmits the data from a hub to a remote or from a remote to another remote is capable of retransmitting a limited amount of data at a given time. When multiple users use the remotes to exchange data, each user is assigned a given bandwidth that he might use during any time. In order to control the usage of the assigned bandwidth, the user has to control the amount of power used during the transmission of data.

Thus, under normal conditions, the user sets up the maximum amount of power to be used by the transmitter of the remote. By normal conditions it is understood clear sky, i.e., no clouds or other particles between the remote and the repeater or the repeater and the hub. However, the clear sky condition does not last indefinitely, and periodically clouds or rain is present between the repeater and the remote on their direct line of sight.

When these conditions (fade) are occurring, the remote or the hub has to increase the transmission power in order to transmit data in the assigned bandwidth. However, the remote does not know where the fading is occurring, and thus, the remote increases the power indiscriminately. This approach may result in overusing the assigned power-bandwidth, resulting in penalties imposed by the owner of the bandwidth.

One solution is to increase the power at the remote less than necessary for compensating the fading. However, this approach has the disadvantage that less than the assigned power-bandwidth is used, limiting the transmitting capabilities of the user.

SUMMARY OF THE INVENTION

According to one aspect of the present invention, a communication system includes a hub, a repeater, and a remote. The hub is configured to adjust a transmission power of the remote depending on an external condition based on (i) a measured carrier-to-noise ratio $CN_{Hubsignal1}$ of data transmitted from the hub to the repeater and back to the hub using a first signal, (ii) a measured carrier-to-noise ratio $CN_{Hubsignal2}$ of data transmitted from the remote to the hub via the repeater using a second signal, (iii) a predetermined carrier-to-noise ratio $CN_{HubSCPCCS}$ of data transmitted from the hub to the repeater and back to the hub using the first signal under a clear sky condition, and (iv) a predetermined carrier-to-noise ratio $CN_{HubTDMACS}$ of data transmitted from a reference remote to the repeater and back to the hub using the second signal under a clear sky condition.

According to another aspect of the present invention, a communication apparatus that communicates with at least one remote via a repeater, includes a control unit configured to adjust a transmission power of the at least one remote depending on an external condition based on (i) a measured carrier-to-noise ratio $CN_{Hubsignal1}$ of data transmitted from the hub to the repeater and back to the hub using a first signal, (ii) a measured carrier-to-noise ratio $CN_{Hubsignal2}$ of data transmitted from the remote to the hub via the repeater using a second signal, (iii) a predetermined carrier-to-noise ratio $CN_{HubSCPCCS}$ of data transmitted from the hub to the repeater and back to the hub using the first signal under a clear sky condition, and (iv) a predetermined carrier-to-noise ratio $CN_{HubTDMACS}$ of data transmitted from a reference remote to the repeater and back to the hub using the second signal under a clear sky condition.

According to still another aspect of the present invention, a computer readable medium stores computer program instructions, which when executed by a computer cause the computer to perform measuring a carrier-to-noise ratio $CN_{Hubsignal1}$ of data transmitted from a hub to a repeater and back to the hub using a first signal, measuring a carrier-to-noise ratio $CN_{Hubsignal2}$ of data transmitted from a remote to the hub via the repeater using a second signal, storing a predetermined carrier-to-noise ratio $CN_{HubSCPCCS}$ of data transmitted from the hub to the repeater and back to the hub using the first type of signal under clear sky condition, storing a predetermined carrier-to-noise ratio $CN_{HubTDMACS}$ of data transmitted from the hub to the repeater and back to the hub using the second type of signal under clear sky condition, and adjusting a transmission power of the remote, depending on an external condition, based on the $CN_{Hubsignal1}$, $CN_{Hubsignal2}$, $CN_{HubSCPCCS}$, and $CN_{HubTDMACS}$.

According to another aspect of the present invention, a method for adjusting a transmission power of a remote that exchanges data with a hub via a repeater, includes measuring a carrier-to-noise ratio $CN_{Hubsignal1}$ of data transmitted from a hub to a repeater and back to the hub using a first signal, measuring a carrier-to-noise ratio $CN_{Hubsignal2}$ of data transmitted from a remote to the hub via the repeater using a second signal, storing a predetermined carrier-to-noise ratio $CN_{HubSCPCCS}$ of data transmitted from the hub to the repeater and back to the hub using the first type of signal under clear sky condition, storing a predetermined carrier-to-noise ratio $CN_{HubTDMACS}$ of data transmitted from the hub to the repeater and back to the hub using the second type of signal under clear sky condition, and adjusting a transmission power of the remote, depending on an external condition, based on the $CN_{Hubsignal1}$, $CN_{Hubsignal2}$, $CN_{HubSCPCCS}$, and $CN_{HubTDMACS}$.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 2a is a diagram illustrating an exemplary satellite network in Single Channel Per Carrier (SCPC) mode;

FIG. 2b is a diagram illustrating an exemplary satellite network in Time Division Multiple Access (TDMA) mode;

DESCRIPTION OF PREFERRED EMBODIMENTS

Figure 1:
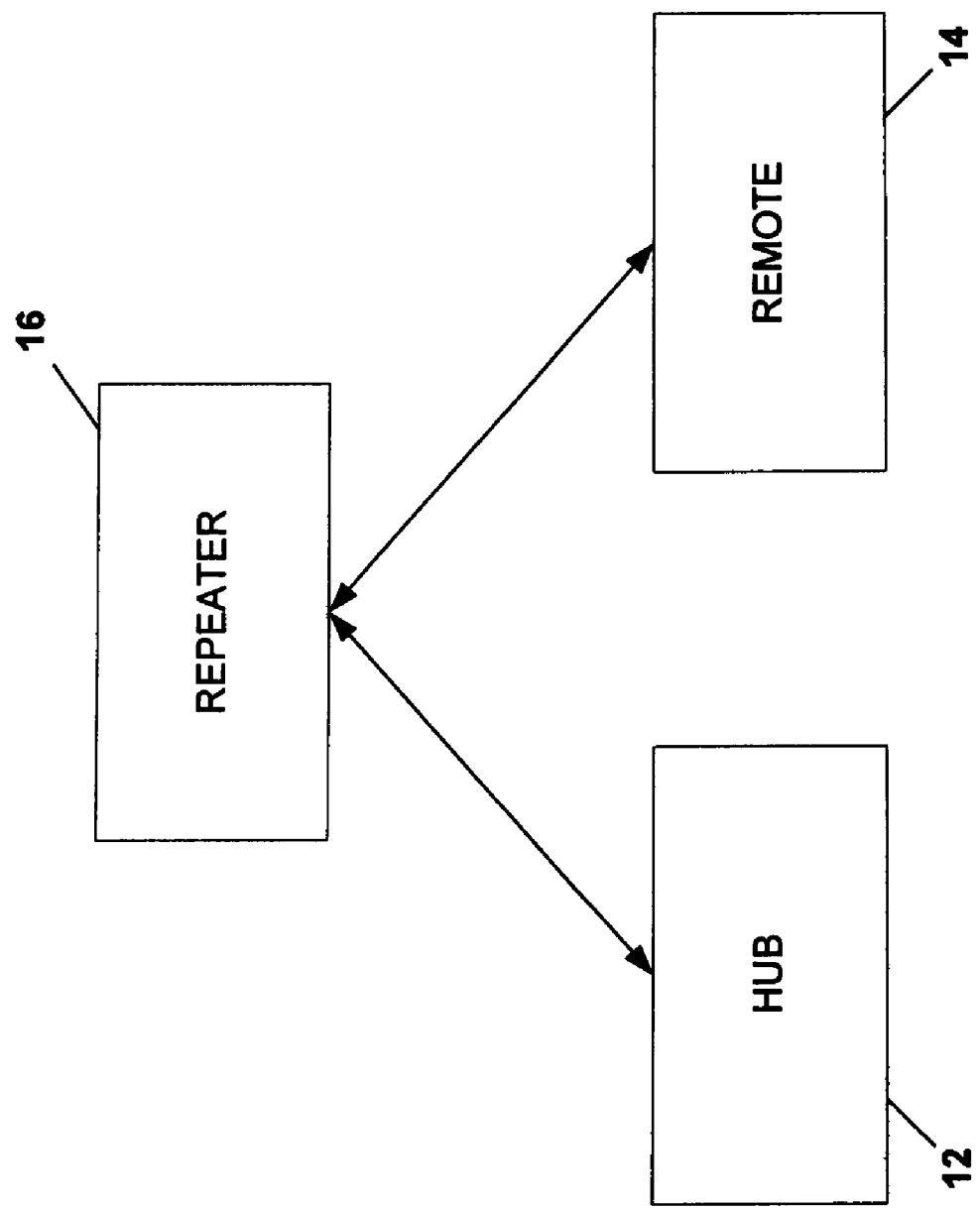
FIG. 1 is a diagram illustrating a communication network.

Referring now to the drawings, wherein like reference numerals designate identical or corresponding parts throughout the several views, and more particularly to FIG. 1, FIG. 1 shows a communication network 10 having a central control server 12 (hub) and a plurality of remote terminals 14 (remotes) that exchange information via a repeater (a geo-synchronous satellite or a wireless communication tower) 16. The hub sends information to the remotes using a continuous broadcast channel, as for example Single Channel Per Carrier (SCPC) or a standard DVB-S2 carrier, and the remotes respond to the hub using, for example, Time Division Multiple Access (TDMA) method as disclosed in patent application Ser. No. 11/764,004, filed on the same day as this application, the entire contents of which are incorporated herein by reference. In one embodiment, other methods are used for transmitting data, as for example SCPC DVB-S2, TDMA, FDM, DVB-RCS in any combination.

The terminology used in this specification is listed next. It is understood that this terminology is for exemplary purposes and not to limit the invention to the specific examples described in the terminology.

C/N—carrier-to-noise ratio,
EPEBW—equal power equal bandwidth is the point at which the percentage of transponder power used is equal to the percentage of transponder bandwidth used,
SPD=EPEBW—spectral power density=equal power equal bandwidth states that the carrier power is such that it uses the same percentage of satellite transponder power as the utilized transponder bandwidth,
UCP—uplink control protocol is the protocol used to control all uplink parameters, including power, frequency, and symbol offset,
UPC—uplink power control is the method used to maintain a desirable power setting while the environment changes,
SCPC Downstream—continuous or not transmission sourced by the hub containing the downstream or outroute data,
SCPC Uplink—transmit SCPC downstream signal from Hub to the satellite,
SCPC Downlink—receive SCPC downstream signal from the satellite,
SCPC Loopback—receive SCPC downstream signal at the hub,
TDMA Upstream—TDMA burst transmission sourced by remotes containing the upstream or inroute data,
TDMA Uplink—transmit TDMA upstream signal sourced by remotes to the satellite,
TDMA Downlink—receive TDMA upstream signal from the satellite,
TDMA Loopback—receive signal of TDMA Uplink of remote N at the same remote N, and
TDMA Peer Downlink—receive signal of TDMA Uplink of remote N but not by the same remote N.

The following parameters can be measured and can be used in controlling the power level of the remotes:
$CN_{HubSCPC}$—SCPC C/N at the hub, which is the SCPC loopback,
$CN_{RmtNSCPC}$—SCPC C/N at a particular remote N,
$CN_{LoopbackSCPC}$—same as $CN_{HubSCPC}$,
$CN_{HubSCPCCS}$ clear sky downstream C/N at the hub, which should be equal to clear sky $CN_{HubSCPC}$
$CN_{HubTDMACS}$—clear sky upstream C/N at the hub, which should be equal to clear sky $CN_{HubTDMA}$
$CN_{RmtNSCPCCS}$—clear sky C/N at particular remote N, which should be equal to clear sky $CN_{RmtNSCPC}$,
$CN_{RmtNTDMACS}$—clear sky C/N at particular remote N, which should be equal to clear sky $CN_{RmtNTDMA}$,
$CN_{HubTDMA}$—TDMA C/N at the hub,
$CN_{RmtNTDMA}$—TDMA C/N at a particular remote N, which could be a TDMA loopback,
$CN_{LoopbackTDMA}$—TDMA C/N of a remote N at the same remote N, and
$CN_{PeerTDMA}$—TDMA C/N of a remote N at remote that is NOT N.
$CN_{UpcHubMargin}$—range of uplink power control equipment can adjust to compensate for fade at the Hub The above parameters and notations are illustrated in FIGS. 2a and 2b. In one embodiment, not all the above parameters are measured for determining the transmission power Tx Power of the hub or of the remote.

According to one embodiment, the transmission power at the hub and/or the remote is adjusted such that an assigned power-equivalent-bandwidth at the hub/remote is not exceeded. A power level that directly influences the transmission power at the hub is adjusted in one embodiment using the UPC unit 18 disposed at the hub. In another embodiment, no UPC unit is provided at the hub. The UPC unit executes an algorithm that maintains the carrier power C/N at a reference level at the satellite in clear sky and in the presence of rain fade locally and remotely. To monitor its performance, various parameters that describe the rain fade are measured as will be discussed next.

A star network includes a hub with a large antenna and multiple remotes with small antennae. In the star network, the UPC adjusts each remote's transmit power on the inbound channel until a nominal signal strength is achieved at the hub. Because of the large hub antenna, the operating point Tx power of a remote is typically below the contracted power at the satellite, yet, is sufficient to close the link (i.e., be received at the hub) and reliably receive data. However, in a star network no communication is taking place directly between remotes and thus, no compensation is necessary at a remote for being able to receive data from another remote.

Figure 3:
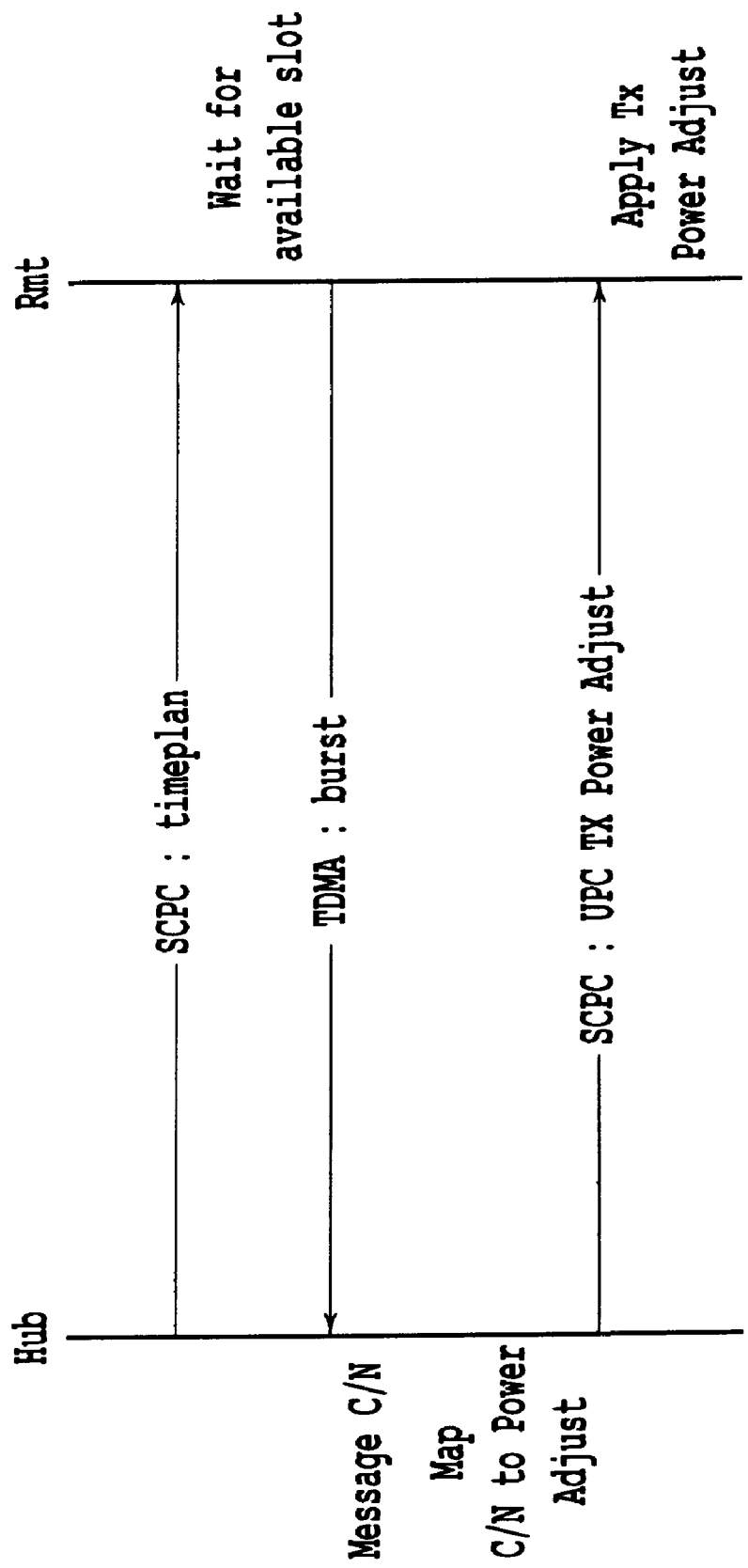
FIG. 3 is a diagram illustrating a transmission power adjustment for a star communication network.

The star configuration UPC is designed to compensate for hub side and/or remote side rain fade. All the activity is centered around the hub. In this scheme, the hub determines when the remote can send bursts, measures the C/N when it is received, and commands the remote to change the Tx power according to a mapping of C/N to power adjust values. A diagram of the protocol is shown in FIG. 3.

For a mesh network, in which remote-to-remote communications are occurring, a remote would not reliably receive data from a peer remote using the same power as in the star configuration. Thus, a method different than one used for the star configuration is described next to compensate under fading conditions the transmission at the remote so that another remote is able to receive the data from the transmitting remote. In one embodiment, the hub determines where the fade is occurring, determines how much the transmission power of the remote should be adjusted, and then transmits to the remote this information so that the remote adjusts itself the transmission power.

In the mesh configuration, each remote is a source and a destination. Therefore, each remote receives bursts from multiple sources at the same power level. This may be accomplished by insuring that bursts from every remote have the same SPD at the satellite.

The mesh configuration UPC architecture is designed to compensate for remote side rain fade. The burst C/N is measured at the hub and the hub transmits Tx power adjustment messages to the remotes. Whereas star UPC does not distinguish between hub side or remote side fade, mesh UPC does distinguish because the reference value for the Tx power is used to achieve the permitted bandwidth.

Next, eight different scenarios are discussed with regard to the mesh network. The eight scenarios are: 1. Clear Sky, 2. Hub Fade, 3. Deep Hub Fade+Hub UPC, 4. Hub Fade+Hub UPC, 5. Hub Fade and Remote Fade, 6. Deep Hub Fade+Hub UPC and Remote Fade, 7. Hub Fade+Hub UPC and Remote Fade, and 8. Remote Fade.

It is noted that either the hub can fade or the remote or both, depending on the atmospheric conditions. In addition, the UPC is provided at the hub and all the measurings and determinations are performed at the hub and then transmitted to the remotes as necessary. Deep fade can occur on a hub with an external UPC device. Deep fade is when the fade is larger than the external UPC device's ability to compensate for the fade. It is necessary to distinguish deep fade from normal fade on a system with an external UPC device because it affects the estimation of the downlink and noise fade.

In one embodiment, the topology discussed next implements the algorithm to compute the Tx Power adjustment entirely at the hub and transmits the computed data to each remote as necessary. As noted in the terminology section, the downstream refers to data transmitted from the hub to the remotes via the satellite. The upstream refers to data transmitted from a remote to the hub or another remote via the satellite.

Figure 5:
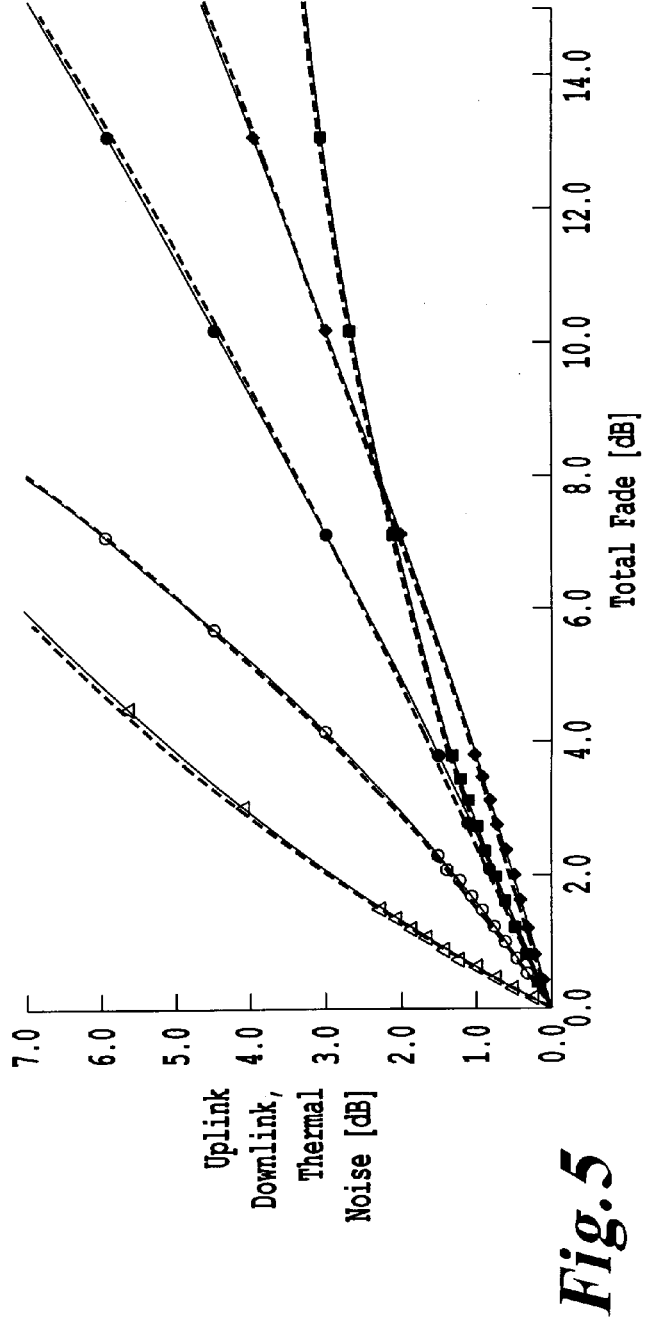
FIG. 5 is a graph illustrating uplink, downlink, and thermal noise estimate curve fits in one embodiment of the present invention.

Terms that have the form $f_{<output>\_<input>}( )$ indicate functions that take input various components (uplink, downlink, and thermal noise components) and generate the output, where the input and output can be any combination of uplink, downlink, and/or rise in thermal noise components. These components are abbreviated as U for uplink, D for downlink, and N for thermal noise. The thermal noise is determined by the movement of the atmosphere particles, similar to Brownian motion, which disrupts the C/N of a propagating signal. In one embodiment, these functions are calculated prior to determining the transmission power as shown in FIG. 5.

More specifically, the U, D, and N components are measured under known conditions and for various rates of fade, i.e., different rain rates. Then, the one of the components, for example the U component, is plotter versus the sum of the U, D, and N components as shown in FIG. 5. Then, when the system is active under an unknown condition, a desired component (in this example U but it also possible to determine D or N) is determined based on (i) the measured U, D, and N and the (ii) corresponding function determined in FIG. 5. In other words, a single component is determined out of the combination of U, D, and N.

In one embodiment, before hub-side and remote-side rain fade are detected, clear sky calibration is performed. During clear sky calibration, measurements of downstream and upstream (respective downlink) signal strengths are recorded during clear sky conditions. The UPC algorithm determines hub-side fade, remote-side fade and correlated fades by comparing the current received upstream and downstream signal strengths against those obtained during clear sky calibration. Each of the eight scenarios is discussed next.

Next, preliminary considerations are presented before explaining how the fade is determined. The C/N measured for TDMA is offset by a fixed offset $UPC_{HubBackoff}$. In one embodiment, this fix offset assures that Tx power does not exceed a predetermined threshold and compensates for unforeseen variations.

The SPD of SCPC and TDMA carriers in mesh networks are not the same. Link budgets often dictate different SPD based on differing availability requirements for each carrier. Factors such as modulation, FEC rate, antenna dish size, BUC capacity, location, and type of installation all affect the resulting C/N, which determines BER performance, and along with BER performance and link margin, availability is ultimately determined.

In one embodiment, the algorithm produces some errors and corrections cannot be applied instantaneously. In one embodiment, if the network is coming out of a rain fade and Tx power is lowered at the same rate as the fade dissipates, there is the possibility of over driving the satellite for some duration. Even under clear sky condition, because of imperfect C/N estimations and hysteresis in the power adjustments, some residue error can remain in the system indefinitely, leading to a Tx power offset that is constantly higher or lower than the appropriate value. In one embodiment, to compensate for this fact, the reference is backed off by $UPC_{HubBackoff}$ to decrease the chances of over driving the satellite at the expense of increased operations below ideal levels.

The offset can be implemented in one embodiment by adding this amount to the measured C/N of the remote TDMA bursts, instead of directly subtracting the offset from the reference, hub clear sky C/N. This is due to the fact that the SCPC C/N contains the hub uplink and downlink+noise components, and some calculations are required to add to the uplink component without affecting the downlink component. However, this is not true of the TDMA burst C/N as the hub's downlink+noise components are independent of the remotes uplink. Thus, the modified TDMA burst C/N is $CN_{HubTDMA}^1$, which is given by $$CN_{HubTDMA}^1 = CN_{HubTDMA} + UPC_{HubBackoff}.$$

However, for simplicity in the following calculations, the $CN_{HubTDMA}$ notation is used instead of the $CN_{HubTDMA}^1$ notation but it is understood whenever the notation $CN_{HubTDMA}$ appears that $CN_{HubTDMA} + UPC_{HubBackoff}$ is intended.

In one embodiment, the amount of remote side uplink fade is determined and the remote's transmit power is adjusted by an equivalent amount to achieve nominal operation (contracted power on satellite). This is achieved as follows:

A determination is made whether the hub side is in clear sky ($CN_{HubSCPCCS} \leq CN_{HubSCPC}$). For clear-sky there is no hub fade, and thus $$\text{downlink+noise} = 0 \qquad (1)$$

If the result of the above determination is that no clear sky is present, then hub-side fade is occurring ($CN_{HubSCPCCS} > CN_{HubSCPC}$), and the downstream SCPC loopback is used to determine the contribution of 'downlink+noise' at the hub under different conditions:

a. if hub-side UPC is not being used, the difference in CN between the downstream SCPC ($CN_{HubSCPC}$) and the clear sky downstream SCPC ($CN_{HubSCPCCS}$) is equal to sum of the uplink and 'downlink+noise' components contributions of the hub side fade. The 'downlink+noise' fade contribution is determined by $$\text{downlink+noise} = f_{U\_UDN}(CN_{HubSCPCCS} - CN_{HubSCPC}) \qquad (2)$$

where the "f" function has been described above and is shown in FIG. 5.

b. if the hub-side UPC is being used (this only compensates for hub side uplink fade) determine if deep hub side fade is occurring. Deep hub side fade ($CN_{HubSCPC} < (CN_{HubSCPCCS} - f_{DN\_U}(CN_{UpcHubMargin}))$) occurs when all UPC margin ($CN_{UpcHubMargin}$) at the hub has been used up. In this condition, the difference in CN between the downstream SCPC ($CN_{HubSCPC}$) and the clear sky downstream SCPC ($CN_{HubSCPCCS}$) is equal to the sum of the 'downlink+noise' contribution of the hub side fade and the excess uplink fade that the hub UPC could not accommodate. The 'downlink+noise' fade contribution is determined by:

$$\text{downlink+noise} = (f_{U\_UDN}(CN_{HubSCPCCS} - CN_{HubSCPC} + UPC_{HubMargin}) - UPC_{HubMargin} \quad (3)$$

c. if hub-side UPC is being used and deep side fade is not occurring $(CN_{HubSCPC} \geq (CN_{HubSCPCCS} - f_{U\_UDN}(CN_{UpcHubMargin}))$, the difference in CN between the downstream SCPC ($CN_{HubSCPC}$) and the clear sky downstream SCPC ($CN_{HubSCPCCS}$) is equal to the 'downlink+noise' contribution of the hub side fade, and thus $$\text{downlink+noise} = CN_{HubSCPCCS} - CN_{HubSCPC} \quad (4)$$

Further, if the above described method does not determine the conditions under which the system operates, a determination is made for the anticipated upstream TDMA CN ($CN_{HubTDMA}'$) based on the 'downlink+noise' components calculated previously for the SCPC loopback $$CN_{HubTDMA}' = CN_{HubTDMACS} - (\text{downlink+noise}) \quad (5)$$

Based on the above determination, that remote side fade is evaluated as being $$\text{remote\_fade} = CN_{HubTDMA}' - CN_{HubTDMA} \quad (6)$$

and the Tx Power ($U_{TDMA}$) is adjusted to compensate for remote side fade occurring, i.e., $$U_{TDMA} = -\text{remote\_fade} \quad (7)$$

Using the above procedure to determine the location and contribution of downlink+noise due to fading conditions, the eight fade scenarios are analyzed.

Clear Sky (at Both Hub and Remote)

Under this scenario, there is no fade at the hub or at the remotes. Thus, for the Clear Sky condition, the following equations hold:

$$CN_{HubSCPCCS} = CN_{HubSCPC} \quad (8)$$

$$CN_{HubTDMACS} = CN_{HubTDMA} \quad (9)$$

Based on (1) the equivalent 'downlink+noise' at hub side equals zero, and equations (2), (3) and (4) do not apply.

Since 'downlink+noise' equals zero, equation (5) determines a target $CN_{HubTDMA}'$ equal to the clear sky $CN_{HubTDMACS}$ $$CN_{HubTDMA}' = CN_{HubTDMACS} - 0 = CN_{HubTDMACS} \quad (10)$$

Thus, using equations (9) and (10) in equation (6), the remote fade is zero.

Under this scenario, no power compensation is necessary at the remotes, and thus, the solution for this fade scenario is $U_{TDMA} = 0$, i.e., the uplink signal from the remote does not require any compensation. When compensation is required because of the fade at the remote, the $U_{TDMA}$ is not zero.

Hub Fade

When the hub goes through a rain fade for example, the downstream loopback $CN_{HubSCPC}$ falls below the clear sky reference. The $CN_{HubTDMA}$ will also fall by a corresponding downlink amount.

In this scenario, the measured downstream loopback $CN_{HubSCPC}$ is less than the clear sky reference $CN_{HubSCPCCS}$. There is no hub UPC, therefore the difference in CN is equal to the SCPC uplink fade and 'downlink+noise' fade. Using the function "f" defined below, the 'downlink+noise' contribution to the fade is obtained based on equation (2). Since there is no hub UPC in this scenario equation (3) and (4) do not apply.

The determination of function "f" is described next in more details. For other scenarios, one of ordinary skill in the art would appreciate that determining an appropriate function "f" is similar to the following example. When the hub goes through a rain fade for example, and the remote does not, the following equation holds:

$$CN_{HubSCPCCS} - CN_{HubSCPC} + U = CN_{HubTDMACS} - CN_{HubTDMA}, \quad (A)$$

which means that the uplink U at the hub side has to be compensated because of the fade. The value of $CN_{HubSCPC}$ is measured under the fade conditions and is not equal to the value of the same quantity under the Clear Sky scenario. The same is true for $CN_{HubTDMA}$. For this reason, the hub uplink U has to be compensated in order that the actual measured value of $CN_{HubSCPC}$ added to U is equal to the value of $CN_{HubSCPCCS}$ from the Clear Sky scenario.

It is also noted that the downlink D and the thermal noise N are not part of equation (A) for the following reasons. With reference to FIGS. 2a-b, when the hub side fades, both the D of the SCPC signal and the D of the TDMA signal fade in the same proportion, thus cancelling each other. The same is true for N. The difference between the hub side and the remote side is that the U of the hub fades and has to be compensated while the $U_{TDMA}$ of the remote does not fade. For this reason, only U and not $U_{TDMA}$ appears in equation (A). In other words, in the following equations that describe the various scenarios to be discussed, only the uplink component which fades (either U or $U_{TDMA}$) appears in the equation.

Based on $$CN_{HubSCPCCS} = CN_{HubSCPC} + U + D + N \quad (B),$$

which can be rearranged as $$U + D + N = CN_{HubSCPCCS} - CN_{HubSCPC} \quad (C)$$

and using the function "f" defined above, the following equation is obtained $$U = f_{U\_UDN}(CN_{HubSCPCCS} - CN_{HubSCPC}) \quad (D)$$

Thus, the $U_{TDMA}$ is zero for the hub fade, which is consistent with the fact that no compensation is required at the remote side because no fade is occurring there.

With regard to equation (C), it is noted that when the hub side fades, each of U, D and N are affected by the fade and for this reason each of these quantities appear in equation (C). The plot of FIG. 5 shows curves for each of $f_{U\_UDN}(\ )$, $f_{U\_DN}(\ )$, and $f_{DN\_U}(\ )$ and polynomial curve-fit equations for them.

Based on the result of equation (2), the target $CN_{HubTDMA}'$ is determined using equation (5). As fade increases, the 'downlink+noise' increases, thereby lowering the target $CN_{HubTDMA}'$. The target $CN_{HubTDMA}'$ drops by the same amount as the 'downlink+noise' of the SCPC loopback. Based on equation (6) the remote fade equals zero since the target $CN_{HubTDMA}'$ and measured $CN_{HubTDMA}$ are equal.

Under this scenario, no power compensation is necessary at the remotes, and thus, the solution for this fade scenario is $U_{TDMA} = 0$, i.e., the uplink signal from the remote does not require any compensation.

Deep Hub Fade+Hub UPC

When the hub goes through a rain fade for example, the downstream loopback $CN_{HubSCPC}$ falls below the clear sky reference. Up until where uplink fade can be compensated by the hub UPC equipment, the change in SCPC loopback is contributed only by 'downlink+noise'. When the fade exceeds the capability of the hub UCP equipment, the additional change in SCPC loopback CN is contributed by both additional uplink and 'downlink+noise'. This deep hub fade is determined by comparing the loopback CN against clear sky conditions and applying an offset equal the equivalent 'downlink+noise' for the uplink compensation $CN_{UpcHubMargin}(CN_{HubSCPC} < (CN_{HubSCPCCS} - f_{DN\_U} (CN_{UpcHubMargin})$. Once determination is made the 'downlink+noise' contribution to the SCPC loopback $CN_{HubSCPC}$ is obtained based on equation (3). This is used in determining the target $CN_{HubTDMA}'$ using equation (5) as before. As fade increases, the 'downlink+noise' increases, thereby lowering the target $CN_{HubTDMA}'$. The target $CN_{HubTDMA}'$ drops by the same amount as the 'downlink+noise' of the SCPC loopback. Based on equation (6) the remote fade equals zero since the target $CN_{HubTDMA}'$ and measured $CN_{HubTDMA}$ are equal.

Under this scenario, no power compensation is necessary at the remotes, and thus, the solution for this fade scenario is $U_{TDMA}=0$, i.e., the uplink signal from the remote does not require any compensation.

Hub Fade+Hub UPC

This scenario is partially similar to Deep Hub Fade+Hub UPC. When the hub goes through a rain fade for example, the downstream loopback $CN_{HubSCPC}$ falls below the clear sky reference. Up until where uplink fade can be compensated by the hub UPC equipment, the change in SCPC loopback is contributed only by 'downlink+noise'. The 'downlink+noise' contribution to the SCPC loopback $CN_{HubSCPC}$ is determined by measuring the difference between the SCPC loopback $CN_{HubSCPC}$ and the clear sky SCPC loopback $CN_{HubSCPCCS}$, equation (4). This is used in determining the target $CN_{HubTDMA}'$ using equation (5) as before. As fade increases, the 'downlink+noise' increases, thereby lowering the target $CN_{HubTDMA}'$. The target $CN_{HubTDMA}'$ drops by the same amount as the 'downlink+noise' of the SCPC loopback. Based on equation (6) the remote fade equals zero since the target $CN_{HubTDMA}'$ and measured $CN_{HubTDMA}$ are equal.

Under this scenario, no power compensation is necessary at the remotes, and thus, the solution for this fade scenario is $U_{TDMA}=0$, i.e., the uplink signal from the remote does not require any compensation.

Hub Fade and Remote Fade

This scenario is partially similar to the scenario Hub Fade only. When the hub goes through a rain fade for example, the downstream loopback $CN_{HubSCPC}$ falls below the clear sky reference. The $CN_{HubTDMA}$ will also fall by a corresponding downlink amount.

In this scenario, the measured downstream loopback $CN_{HubSCPC}$ is less than the clear sky reference $CN_{HubSCPCCS}$. There is no hub UPC, therefore the difference in CN is equal to the SCPC uplink fade and 'downlink+noise' fade. Using the function "f" defined above, for example $f_{U\_UDN}$, the 'downlink+noise' contribution to the fade is obtained per equation (2). Since there is no hub UPC in this scenario, equations (3) and (4) do not apply.

Based on equation (2), the target $CN_{HubTDMA}'$ is determined using equation (5). As the fade increases, the 'downlink+noise' increases, thereby lowering the target $CN_{HubTDMA}'$. The target $CN_{HubTDMA}'$ drops by the same amount as the 'downlink+noise' of the SCPC loopback. Based on equation (6), the remote fade equals the difference between the target $CN_{HubTDMA}'$ and measured $CN_{HubTDMA}$.

Under this scenario, power compensation is necessary at the remote, and thus, the solution for this fade scenario is $U_{TDMA}$=remote_fade, i.e., the uplink signal from the remote requires compensation increase by a value equal to remote_fade.

Deep Hub Fade+Hub UPC and Remote Fade

This scenario is partially similar to Deep Hub Fade+Hub UPC. When the hub goes through a rain fade for example, the downstream loopback $CN_{HubSCPC}$ falls below the clear sky reference. Up until where uplink fade can be compensated by the hub UPC equipment, the change in SCPC loopback is contributed only by 'downlink+noise'. When the fade exceeds the capability of the hub UCP equipment, the additional change in SCPC loopback CN is contributed by both additional uplink and 'downlink+noise'. This deep hub fade is determined by comparing the loopback CN against clear sky conditions and applying an offset equal the equivalent 'downlink+noise' for the uplink compensation $CN_{UpcHubMargin}(CN_{HubSCPC} < (CN_{HubSCPCCS} - f_{DN\_U} (CN_{UpcHubMargin})$. Once a determination is made the 'downlink+noise' contribution to the SCPC loopback $CN_{HubTDMA}'$ is obtained based on equation (3). This is used in determining the target $CN_{HubTDMA}'$ using equation (5) as before. As fade increases, the 'downlink+noise' increases, thereby lowering the target $CN_{HubTDMA}'$. The target $CN_{HubTDMA}'$ drops by the same amount as the 'downlink+noise' of the SCPC loopback. Based on equation (6) the remote fade equals the difference between the target $CN_{HubTDMA}'$ and measured $CN_{HubTDMA}$.

Under this scenario, power compensation is necessary at the remote, and thus, the solution for this fade scenario is $U_{TDMA}$=remote_fade, i.e., the uplink signal from the remote requires compensation increase by a value equal to remote_fade.

Hub Fade+Hub UPC and Remote Fade

This scenario is partially similar to Hub Fade+Hub UPC. When the hub goes through a rain fade for example, the downstream loopback $CN_{HubSCPC}$ falls below the clear sky reference. Up until where uplink fade can be compensated by the hub UPC equipment, the change in SCPC loopback is contributed only by 'downlink+noise'. The 'downlink+noise' contribution to the SCPC loopback $CN_{HubSCPC}$ is determined by measuring the difference between the SCPC loopback $CN_{HubSCPC}$ and the clear sky SCPC loopback $CN_{HubSCPCCS}$, equation (4). This is used in determining the target $CN_{HubTDMA}'$ using equation (5) as before. As fade increases, the 'downlink+noise' increases, thereby lowering the target $CN_{HubTDMA}'$. The target $CN_{HubTDMA}'$ drops by the same amount as the 'downlink+noise' of the SCPC loopback. Based on equation (6), the remote fade equals the difference between the target $CN_{HubTDMA}'$ and measured $CN_{HubTDMA}$.

Under this scenario, power compensation is necessary at the remote, and thus, the solution for this fade scenario is $U_{TDMA}$=remote_fade, i.e., the uplink signal from the remote requires compensation increase by a value equal to remote_fade.

Remote Fade Only

When a fade only occurs at a remote, the hub SCPC loopback $CN_{HubSCPC}$ equals the $CN_{HubSCPCCS}$ and based on equation (1), the hub-side 'downlink+noise' equals zero. Since the 'downlink+noise' equals zero, the target $CN_{HubTDMA}'$ equals the clear sky TDMA $CN_{HubTDMACS}$. Thus, the remote_fade is determined by measuring the delta between the clear sky TDMA $CN_{HubTDMACS}$ and $CN_{HubTDMA}$.

Under this scenario, power compensation is necessary at the remote, and thus, the solution for this fade scenario is $U_{TDMA}$=remote_fade, i.e., the uplink signal from the remote requires compensation increase by a value equal to remote_fade.

A common feature observed by the inventors for all eight scenarios discussed above, is that the uplink at the remote, when corrected, depends only on the loopback SCPC of the hub $CN_{HubSCPC}$ and the TDMA signal at the hub $CN_{HubTDMA}$. Further, these two quantities can be measured at the hub at any time, which allows to estimate a fade at the hub or at the remote based only on these two measured quantities.

Thus, the control unit at the hub, based on the two quantities noted above and the constants $CN_{HubSCPCCS}$ and $CN_{HubTDMACS}$, is able to estimate where the fade occurs, and to correct accordingly the uplink from the remote without the danger of overusing the assigned bandwidth at the satellite. Further, is it noted that the above discussed eight scenarios cover all possible scenarios when communication is performed between a hub and a remote via a repeater and thus, the following method is capable to adjust the power level of any remote under any external conditions in a communication network.

Figure 4:
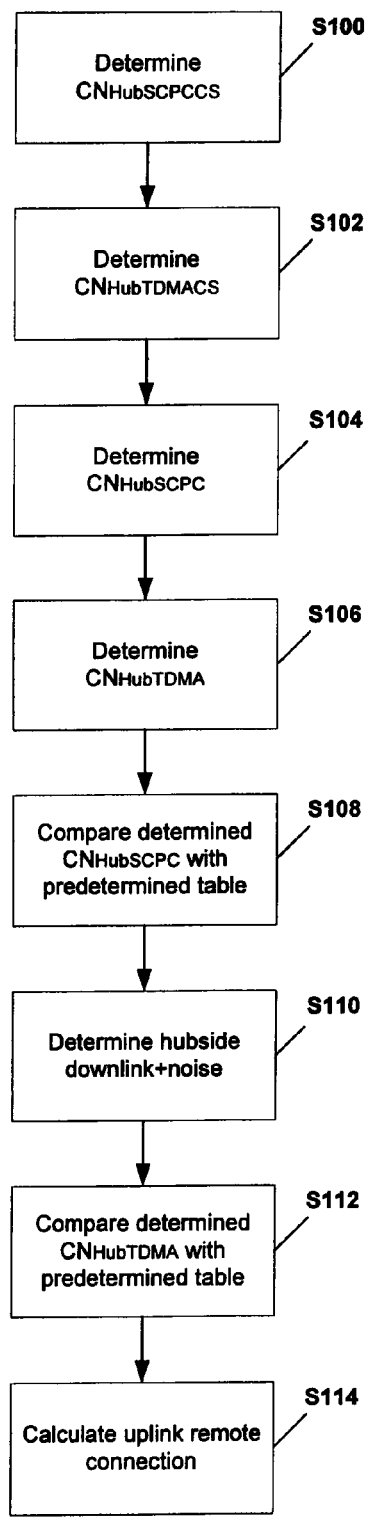
FIG. 4 is a flow chart illustrating a method used to adjust a transmission power of a remote.

A method of determining a fade and calculating the uplink for the remote is shown in FIG. 4. In S100 the $CN_{HubSCPCCS}$ is determined under clear sky for the communication system. In one embodiment, the $CN_{HubSCPCCS}$ is a constant and it is determined only once. In S102, the $CN_{HubTDMACS}$ is determined under clear sky for the communication system. In one embodiment, the $CN_{HubTDMACS}$ is a constant and it is determined only once. In S104 the $CN_{HubSCPC}$ is measured at a given instant under an unknown condition to be determined. In one embodiment, the $CN_{HubSCPC}$ is determined regularly (for example every 2 seconds). In S106, the $CN_{HubTDMA}$ is determined at the same given instant. In one embodiment the two hub quantities are determined at different times. The determined $CN_{HubSCPC}$ and a table stored in the communication control server are compared in S108 and based on this comparison, in S110 the "downlink+noise" elements are determined.

The predetermined table may be a table that corresponds each of the eight scenarios with various equations that are true for the corresponding scenario. The equations in the table have been discussed above with regard to each scenario. Based on the determined "downlink+noise," in S112 the determined $CN_{HubTDMA}$ is also compared with the predetermined table. It is noted that the equations discussed above that may be included in the table, have both the $CN_{HubSCPC}$ and $CN_{HubTDMA}$ as variables, i.e., both values of these quantities uniquely define a scenario. In S114, based on the $CN_{HubSCPC}$ and $CN_{HubTDMA}$ and the predetermined table, a scenario is identified and a solution for the $U_{TDMA}$ is determined. This solution is then transmitted to a corresponding remote to update the uplink of the remote to account for a possible fade.

The method can be implemented as a computer code stored in a computer readable-media in one embodiment or can be embedded in a microprocessor in another embodiment. The method also determines whether the UPC is enabled or disabled and thus the result of this determination is used further to determine which scenario applies.

The correspondence between the various scenarios and the corresponding solution for $U_{TDMA}$ can be prestored in a table in a memory or any computer readable medium, as a floppy, CD, any memory, processor, etc. that are known to one of ordinary skill in the art.

The loopback C/N estimates can be used to make one estimate of the site's uplink and downlink+noise. Additional uplink estimates are possible from all other sites that receive this signal as an inbound signal and can compare it with their local loopback signal. For example, if there are four sites A, B, C, and D, and the uplink and downlink+noise of site A is desired, then there can be 4 estimates for uplink and 1 estimate for downlink+noise. At site A, the loopback C/N can be used to estimate 1 uplink and 1 downlink+noise for A. At site B, its loopback C/N and inbound C/N from A can be used to estimate A's uplink. Likewise, this can be repeated for C and D.

The method of adjusting the transmission power of the hub and/or remote may be implemented in a dedicated microprocessor or a computer system known to one of ordinary skill in the art. Alternatively, the method can be implemented in software and stored on a computer readable-medium such that, when executed by a computer, determine the computer to execute the steps discussed with regard to FIG. 4.

Figure 6:
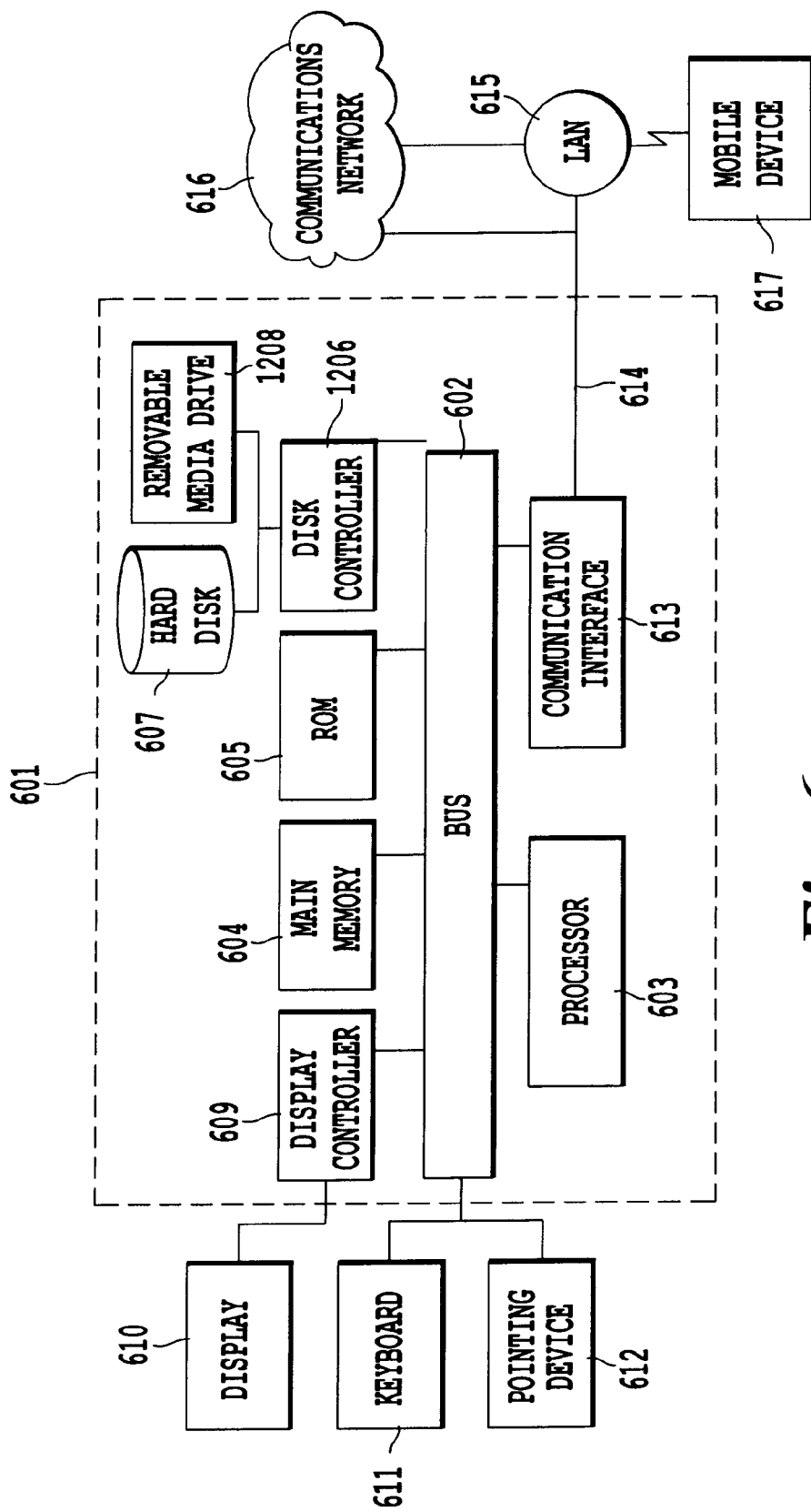
FIG. 6 is a diagram illustrating a general computer that the remote or a hub uses in one embodiment of the present invention.

FIG. 6 illustrates one possible computer system 601 upon which an embodiment of the present invention may be implemented. However, one of ordinary skill in the art would appreciate that any computational system, portable or not, is appropriate to one or more embodiments of the present invention. The computer system 601 includes a bus 602 or other communication mechanism for communicating information, and a processor 603 coupled with the bus 602 for processing the information. The computer system 601 also includes a main memory 604, such as a random access memory (RAM) or other dynamic storage device (e.g., dynamic RAM (DRAM), static RAM (SRAM), and synchronous DRAM (SDRAM)), coupled to the bus 602 for storing information and instructions to be executed by processor 603. In addition, the main memory 604 may be used for storing temporary variables or other intermediate information during the execution of instructions by the processor 603. The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 601 may also include a display controller 609 coupled to the bus 602 to control a display 610, such as a cathode ray tube (CRT), for displaying information to a computer user. The computer system includes input devices, such as a keyboard 611 and a pointing device 612, for interacting with a computer user and providing information to the processor 603. The pointing device 612, for example, may be a mouse, a trackball, or a pointing stick for communicating direction information and command selections to the processor 603 and for controlling cursor movement on the display 610. In addition, a printer may provide printed listings of data stored and/or generated by the computer system 601.

The computer system 601 performs a portion or all of the processing steps of the invention in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 601, for driving a device or devices for implementing the invention, and for enabling the computer system 601 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 603 for execution. A computer readable medium may take many forms, including but not limited to, non-volatile media, volatile media, and transmission media. Non-volatile media includes, for example, optical, magnetic disks, and magneto-optical disks, such as the hard disk 607 or the removable media drive 608. Volatile media includes dynamic memory, such as the main memory 604. Transmission media includes coaxial cables, copper wire and fiber optics, including the wires that make up the bus 602. Transmission media also may also take the form of acoustic or light waves, such as those generated during radio wave and infrared data communications.

Various forms of computer readable media may be involved in carrying out one or more sequences of one or more instructions to processor 603 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 601 may receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 604, from which the processor 603 retrieves and executes the instructions. The instructions received by the main memory 604 may optionally be stored on storage device 607 or 608 either before or after execution by processor 603.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a network interface card to attach to any packet switched LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc). The signals through the various networks and the signals on the network link 614 and through the communication interface 613, which carry the digital data to and from the computer system 601 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA) laptop computer, or cellular telephone.

Based on the above description of a computer, in one embodiment, the hub includes one or more components of the computer of FIG. 6 and the memory can be used to store the functions shown in FIG. 5 and the determined values, and the microprocessor can measure the determined value, and calculate the adjustment of the transmission power.

Numerous modifications and variations of the present invention are possible in light of the above teachings. It is therefore to be understood that within the scope of the appended claims, the invention may be practiced otherwise than as specifically herein.

What is claimed is:

1. A communication system comprising:
   a hub with uplink power control having a power control margin corresponding to a magnitude of a hub side uplink fade condition that can be overcome by the uplink power control;

a repeater; and a remote, the hub is configured to evaluate a value of a first predetermined function at an arithmetic combination of (a) the power control margin of the hub, (b) a predetermined carrier-to-noise ratio $CN_{HubSCPCCS}$ of data transmitted from the hub to the repeater and back to the hub using a first signal under a clear sky condition, and (c) a measured carrier-to-noise ratio $CN_{Hubsignal1}$ of data transmitted from the hub to the repeater and back to the hub using the first signal, determine an external condition to be a deep fade condition when a magnitude of the external condition is greater than a difference between the clear sky condition and an evaluated value of a second predetermined function at the power control margin of the hub, and adjust a transmission power of the remote depending on the external condition determined to be the deep fade condition based on (i) the measured carrier-to-noise ratio $CN_{Hubsignal1}$ of data transmitted from the hub to the repeater and back to the hub using the first signal, (ii) a measured carrier-to-noise ratio $CN_{Hubsignal2}$ of data transmitted from the remote to the hub via the repeater using a second signal, (iii) the predetermined carrier-to-noise ratio $CN_{HubSCPCCS}$ of data transmitted from the hub to the repeater and back to the hub using the first signal under the clear sky condition, (iv) a predetermined carrier-to-noise ratio $CN_{HubTDMACS}$ of data transmitted from a reference remote to the repeater and back to the hub using the second signal under the clear sky condition, and (v) the evaluated value of the first predetermined function based on the power control margin of the hub.

2. The communication system of claim 1, wherein the repeater is an earth orbit satellite.

3. The communication system of claim 1, wherein the first signal is different from the second signal.

4. The communication system of claim 1, wherein the first signal uses a continuous broadcast channel and the second signal uses Time Division Multiple Access (TDMA).

5. The communication system of claim 1, the system further comprising:

another remote; and the hub is further configured to adjust a transmission power of the another remote such that the remote and the another remote exchange data with each other under the external condition.

6. The communication system of claim 1, wherein the external condition is one of clear sky, hub fade, hub fade and the hub has an uplink power control (UPC) unit, deep hub fade and the hub has the UPC unit, remote fade, hub fade and remote fade, hub fade and the hub has UPC unit and remote fade, and deep hub fade and the hub has UPC unit and remote fade.

7. The communication system of claim 1, wherein the hub is configured to determine that the external condition is no fade at the hub and no fade at the remote when the hub determines that $CN_{Hubsignal1}$ is equal to $CN_{HubSCPCCS}$ and $CN_{Hubsignal2}$ is equal to $CN_{HubTDMACS}$.

8. The communication system of claim 1, wherein the hub is configured to determine that the external condition is hub fade and there is no uplink power control at the hub when the hub determines that a downlink component plus a noise component of the first signal is function only of $CN_{Hubsignal1}$ and $CN_{HubSCPCCS}$.

9. The communication system of claim 8, wherein the hub is configured to maintain the transmission power of the remote when the hub fade condition is determined.

10. The communication system of claim 1, wherein the hub is configured to determine that the external condition is hub fade and there is uplink power control (UPC) at the hub when the hub determines that a downlink component plus a noise component of the first signal is the difference between $CN_{Hubsignal1}$ and $CN_{HubSCPCCS}$.

11. The communication system of claim 10, wherein the hub is configured to maintain the transmission power of the remote when the hub fade condition with UPC is determined.

12. The communication system of claim 1, wherein the hub is configured to determine that the external condition is remote fade when the hub determines that a target value is different from $CN_{Hubsignal2}$.

13. The communication system of claim 12, wherein the target value is the difference between $CN_{HubTDMACS}$ and a downlink component plus a noise component of the first signal.

14. The communication system claim 1, wherein the hub determines the $CN_{Hubsignal1}$ and $CN_{Hubsignal2}$ periodically.

15. The communication system of claim 1, wherein the communication system is a mesh network.

16. A communication apparatus that communicates with at least one remote via a repeater, comprising:

an uplink power controller having a power control margin corresponding to a magnitude of a hub side uplink fade condition that can be overcome by the uplink power controller; and a control unit configured to evaluate a value of a first predetermined function at an arithmetic combination of (a) the power control margin of the hub, (b) a predetermined carrier-to-noise ratio $CN_{HubSCPCCS}$ of data transmitted from the hub to the repeater and back to the hub using a first signal under a clear sky condition, and (c) a measured carrier-to-noise ratio $CN_{Hubsignal1}$ of data transmitted from the hub to the repeater and back to the hub using the first signal, determine an external condition to be a deep fade condition when a magnitude of the external condition is greater than a difference between the clear sky condition and an evaluated value of a second predetermined function at the power control margin of the hub, and adjust a transmission power of the at least one remote depending on the external condition determined to be the deep fade condition based on (i) the measured carrier-to-noise ratio $CN_{Hubsignal1}$ of data transmitted from the hub to the repeater and back to the hub using the first signal, (ii) a measured carrier-to-noise ratio $CN_{Hubsignal2}$ of data transmitted from the remote to the hub via the repeater using a second signal, (iii) the predetermined carrier-to-noise ratio $CN_{HubSCPCCS}$ of data transmitted from the hub to the repeater and back to the hub using the first signal under the clear sky condition, (iv) a predetermined carrier-to-noise ratio $CN_{HubTDMACS}$ of data transmitted from a reference remote to the repeater and back to the hub using the second signal under the clear sky condition, and (v) the evaluated value of the first predetermined function based on the power control margin of the hub.

17. A non-transitory computer readable medium storing computer program instructions, which when executed by a computer, determine the computer to perform the following steps:

operating a hub with uplink power control having a power control margin corresponding to a magnitude of a hub side uplink fade condition that can be overcome by the uplink power control;

measuring a carrier-to-noise ratio $CN_{Hubsignal1}$ of data transmitted from the hub to a repeater and back to the hub using a first signal;

measuring a carrier-to-noise ratio $CN_{Hubsignal2}$ of data transmitted from a remote to the hub via the repeater using a second signal;

storing a predetermined carrier-to-noise ratio $CN_{HubSCPCCS}$ of data transmitted from the hub to the repeater and back to the hub using the first signal under a clear sky condition;

storing a predetermined carrier-to-noise ratio $CN_{HubTDMACS}$ of data transmitted from the hub to the repeater and back to the hub using the second signal under the clear sky condition;

evaluating a value of a first predetermined function at an arithmetic combination of (a) the power control margin of the hub, (b) the predetermined carrier-to-noise ratio $CN_{HubSCPCCS}$ of data transmitted from the hub to the repeater and back to the hub using the first signal under the clear sky condition, and (c) a measured carrier-to-noise ratio $CN_{Hubsignal1}$ of data transmitted from the hub to the repeater and back to the hub using the first signal;

determining an external condition to be a deep fade condition when a magnitude of the external condition is greater than a difference between the clear sky condition and an evaluated value of a second predetermined function at the power control margin of the hub; and adjusting a transmission power of the remote, depending on the external condition determined to be the deep fade condition, based on the $CN_{Hubsignal1}$, $CN_{Hubsignal2}$, $CN_{HubSCPCCS}$, $CN_{HubTDMACS}$, and the evaluated value of the first predetermined function based on the power control margin of the hub.

18. The non-transitory computer medium of claim 17, further storing instructions for:

determining that the external condition is no fade at the hub and no fade at the remote when the hub determines that $CN_{Hubsignal1}$ is equal to $CN_{HubSCPCCS}$ and $CN_{Hubsignal2}$ is equal to $CN_{HubTDMACS}$.

19. The non-transitory computer medium of claim 17, further storing instructions for:

determining that the external condition is hub fade and there is no uplink power control at the hub when the hub determines that a downlink component plus a noise component of the first signal is function only of $CN_{Hubsignal1}$ and $CN_{HubSCPCCS}$.

20. The non-transitory computer medium of claim 19, further storing instructions for:

maintaining the transmission power of the remote when the hub fade condition is determined.

21. The non-transitory computer medium of claim 17, further storing instructions for:

determining that the external condition is hub fade and there is uplink power control (UPC) at the hub when the hub determines that a downlink component plus a noise component of the first signal is the difference between $CN_{Hubsignal1}$ and $CN_{HubSCPCCS}$.

22. The non-transitory computer medium of claim 21, further storing instructions for:

maintaining the transmission power of the remote when the hub fade condition with UPC is determined.

23. The non-transitory computer medium of claim 17, further storing instructions for:

determining that the external condition is remote fade when the hub determines that a target value is different from $CN_{Hubsignal2}$.

24. The non-transitory computer medium of claim 23, further storing instructions for:

estimating the target value as the difference between $CN_{HubTDMACS}$ and a downlink component plus a noise component of the first signal.

25. The non-transitory computer medium of claim 17, further storing instructions for:

determining the $CN_{Hubsignal1}$ and $CN_{Hubsignal2}$ periodically.

26. A method for adjusting a transmission power of a remote that exchanges data with a hub via a repeater, comprising:

operating the hub with uplink power control having a power control margin corresponding to a magnitude of a hub side uplink fade condition that can be overcome by the uplink power control;

measuring a carrier-to-noise ratio $CN_{Hubsignal1}$ of data transmitted from the hub to a repeater and back to the hub using a first signal;

measuring a carrier-to-noise ratio $CN_{Hubsignal2}$ of data transmitted from a remote to the hub via the repeater using a second signal;

storing a predetermined carrier-to-noise ratio $CN_{HubSCPCCS}$ of data transmitted from the hub to the repeater and back to the hub using the first signal under a clear sky condition;

storing a predetermined carrier-to-noise ratio $CN_{HubTDMACS}$ of data transmitted from the hub to the repeater and back to the hub using the second signal under a clear sky condition;

evaluating a value of a first predetermined function at an arithmetic combination of (a) the power control margin of the hub, (b) the predetermined carrier-to-noise ratio $CN_{HubSCPCCS}$ of data transmitted from the hub to the repeater and back to the hub using the first signal under the clear sky condition, and (c) a measured carrier-to-noise ratio $CN_{Hubsignal1}$ of data transmitted from the hub to the repeater and back to the hub using the first signal;

determining an external condition to be a deep fade condition when a magnitude of the external condition is greater than a difference between the clear sky condition and an evaluated value of a second predetermined function at the power control margin of the hub; and adjusting a transmission power of the remote, depending on the external condition determined to be the deep fade condition, based on the $CN_{Hubsignal1}$, $CN_{Hubsignal2}$, $CN_{HubSCPCCS}$, $CN_{HubTDMACS}$, and the evaluated value of the first predetermined function based on the power control margin of the hub.

\* \* \* \* \*